United States Patent
Yokoi

(10) Patent No.: US 9,862,423 B2
(45) Date of Patent: Jan. 9, 2018

(54) VEHICLE REAR PORTION STRUCTURE

(71) Applicant: TOYOTA JIDOSHA KABUSHIKI KAISHA, Toyota-shi, Aichi-ken (JP)

(72) Inventor: Yoshimitsu Yokoi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/910,449

(22) PCT Filed: Dec. 5, 2014

(86) PCT No.: PCT/JP2014/082908
§ 371 (c)(1),
(2) Date: Feb. 5, 2016

(87) PCT Pub. No.: WO2015/087991
PCT Pub. Date: Jun. 18, 2015

(65) Prior Publication Data
US 2016/0297481 A1 Oct. 13, 2016

(30) Foreign Application Priority Data
Dec. 13, 2013 (JP) .................. 2013-258436

(51) Int. Cl.
*B62D 21/15* (2006.01)
*B62D 25/04* (2006.01)
*B62D 25/08* (2006.01)
*B62D 27/02* (2006.01)

(52) U.S. Cl.
CPC .......... *B62D 25/04* (2013.01); *B62D 25/087* (2013.01); *B62D 27/02* (2013.01)

(58) Field of Classification Search
CPC .. B62D 25/087; B62D 27/02; B62D 25/2027; B62D 25/088; B62D 25/2081
USPC ........................................ 296/187.5
See application file for complete search history.

(56) References Cited

U.S. PATENT DOCUMENTS

| | | | |
|---|---|---|---|
| 2009/0289475 A1 | 11/2009 | Walter et al. | |
| 2013/0341970 A1 | 12/2013 | Shimizu et al. | |
| 2014/0252805 A1 | 9/2014 | Grosse et al. | |
| 2015/0042129 A1* | 2/2015 | Cho ........................ | B62D 25/08 296/203.04 |
| 2016/0090128 A1* | 3/2016 | Takeda .................. | B62D 25/087 296/193.08 |

FOREIGN PATENT DOCUMENTS

| | | |
|---|---|---|
| DE | 10 2008 024 702 A1 | 11/2009 |
| DE | 10 2011 086 709 A1 | 5/2013 |

(Continued)

*Primary Examiner* — Pinel Romain
(74) *Attorney, Agent, or Firm* — Oliff PLC

(57) ABSTRACT

An object is to provide a vehicle rear portion structure that improves rigidity of a vehicle rear portion. At a wheel house connecting member, both end portions in a vehicle transverse direction of a top surface portion are joined to joining stays that are provided at wheel houses, and lower portions of both end portions in the vehicle transverse direction of a vertical wall portion, that extends toward a vehicle lower side from the top surface portion, are joined to fixing members. Accordingly, vehicle rigidity between the wheel houses, that are connected by the wheel house connecting member at a rear portion of a vehicle, improves.

6 Claims, 11 Drawing Sheets

(56) References Cited

FOREIGN PATENT DOCUMENTS

| | | |
|---|---|---|
| EP | 1 602 564 A2 | 12/2005 |
| JP | H01-38711 B2 | 8/1989 |
| JP | H10-258772 A | 9/1998 |
| JP | 2004-009757 A | 1/2004 |
| JP | 2006-069265 A | 3/2006 |
| KR | 101490923 B1 * | 2/2015 ............ B62D 25/08 |
| WO | 2012/121142 A1 | 9/2012 |

\* cited by examiner

VEHICLE REAR PORTION STRUCTURE

TECHNICAL FIELD

The present invention relates to a vehicle rear portion structure.

BACKGROUND ART

Japanese Patent Application Laid-Open (JP-A) No. 2004-009757 discloses a vehicle rear portion structure in which a parcel member, that connects rear wheel house portions, is provided at the top surface portions of the rear wheel house portions that are formed integrally with the left and right vertical wall portions of a rear floor panel.

Here, in a structure in which a parcel member is connected to the top surface portions of the left and right rear wheel house portions, the parcel member is substantially joined by pins to the rear wheel houses, and hardly contributes at all to the effect of improving the vehicle rigidity between the left and right rear wheel house portions. Note that joining by pins is a method of joining in which the joined region rotates when horizontal force is applied.

Accordingly, a parcel member that is substantially joined by pins to rear wheel houses hardly resists at all shearing deformation in the vehicle transverse direction. (Refer to JP-A No. 2004-009757.)

SUMMARY OF INVENTION

Technical Problem

In consideration of the above-described circumstances, an object of the present invention is to provide a vehicle rear portion structure that improves the rigidity of the vehicle rear portion.

Solution to Problem

A first aspect of the present invention includes: wheel houses that are provided at both side portions in a vehicle transverse direction at a vehicle rear portion, and to which lower end portions of first quarter pillars, that extend in a vehicle vertical direction, are joined, and to which both side portions of a rear floor panel, that structures a vehicle floor portion, are joined; a wheel house connecting member that connects the wheel houses; an upper side member that structures an upper portion side of the wheel house connecting member, and whose both end portions in the vehicle transverse direction are joined respectively to joining members that are joined to the wheel houses and the first quarter pillars; and a lower side member that extends toward a vehicle vertical direction lower side from the upper side member of the wheel house connecting member, and whose lower portions of both end portions in the vehicle transverse direction are joined respectively to fixing members that are joined to the wheel houses and the rear floor panel.

In the first aspect of the present invention, the both end portions in the vehicle transverse direction of the upper side member of the wheel house connecting member are joined respectively to the joining members that are joined to the joined regions of the wheel houses and the first quarter pillars. Further, the lower portions of both end portions in the vehicle transverse direction of the lower side member, that extends toward the vehicle lower side from the upper side member, are joined respectively to the fixing members that are joined to the wheel houses and the rear floor panel.

In this way, the wheel house connecting member is joined at at least four places that are the end portions of the upper side member and the lower portions of the end portions of the lower side members, at the both end portions in the vehicle transverse direction. Therefore, the wheel house connecting member effectively resists shearing deformation in the vehicle transverse direction. Accordingly, the vehicle rigidity between the wheel houses, that are connected by the wheel house connecting member, improves.

In a second aspect of the present invention, in the structure of the first aspect, a deck board, that structures a floor surface of a luggage compartment, is supported by the upper side member of the wheel house connecting member.

In the second aspect of the present invention, the deck board, that structures the floor surface of the luggage compartment, is supported by the upper side member of the wheel house connecting member. Namely, the wheel house connecting member has two functions that are the function of improving the vehicle rigidity and the function of supporting the deck board. Accordingly, there is no need to separately provide a member that supports the deck board.

A third aspect of the present invention includes, in the structure of the first or second aspect: second quarter pillars that are provided at vehicle rear sides of the first quarter pillars at the both side portions in the vehicle transverse direction of the vehicle rear portion, and that extend in the vehicle vertical direction; and pillar connecting members that are joined respectively to the second quarter pillars and joined regions of the first quarter pillars and the wheel houses, and that connect the second quarter pillars and the joined regions.

In the third aspect of the present invention, the pillar connecting member, that is joined to the joined region of the first quarter pillar and the wheel house, receives falling-in deformation in which the second quarter pillar deforms so as to fall toward the vehicle vertical direction lower side due to twisting input being applied to the vehicle. Therefore, falling-in deformation of the second quarter pillar is effectively suppressed.

Moreover, the wheel house connecting member and the joining members connect the joined regions of the first quarter pillars and the wheel houses at the vehicle transverse direction both sides. Further, at each of the vehicle transverse direction both sides, the pillar connecting member connects the second quarter pillar and the joined region of the first quarter pillar and the wheel house. Accordingly, there is a structure in which the first quarter pillars, the pillar connecting members and the second quarter pillars at the vehicle transverse direction both sides are connected by the wheel house connecting member and the joining members. Accordingly, the rigidity of the vehicle rear portion improves more effectively.

In a fourth aspect of the present invention, in the structure of the third aspect, the pillar connecting members are disposed at acute angles with respect to the vehicle vertical direction as seen in a vehicle side view.

In the fourth aspect of the present invention, there is a structure in which the connecting member receives the falling-in deformation of the second quarter pillar more as axial force than as bending (twisting) deformation, and therefore, the falling-in deformation of the second quarter pillar is suppressed more. Accordingly, the rigidity of the vehicle rear portion improves more effectively.

Advantageous Effects of Invention

In accordance with the first aspect of the present invention, the rigidity of the vehicle rear portion can be improved.

In accordance with the second aspect of the present invention, the members that support the deck board can be reduced.

In accordance with the third aspect of the present invention, the rigidity of the vehicle rear portion can be improved effectively.

In accordance with the fourth aspect of the present invention, the rigidity of the vehicle rear portion can be improved more effectively.

DESCRIPTION OF EMBODIMENTS

Embodiment

A vehicle rear portion structure relating to an embodiment of the present invention is described. Note that arrow FR, that is shown appropriately in the respective drawings, indicates the vehicle longitudinal direction front side, arrow UP indicates the vehicle vertical direction upper side, and arrow OUT indicates the vehicle transverse direction outer side.

Further, although the vehicle side portion at the right side in a case of facing toward the vehicle front side is illustrated in the respective drawings, the vehicle side portion at the left side has the same structure. Further, a vehicle 10, to which the vehicle rear portion structure relating to the embodiment of the present invention is applied, is a hatchback vehicle having a back door at the vehicle rear end portion thereof.

Figure 1:
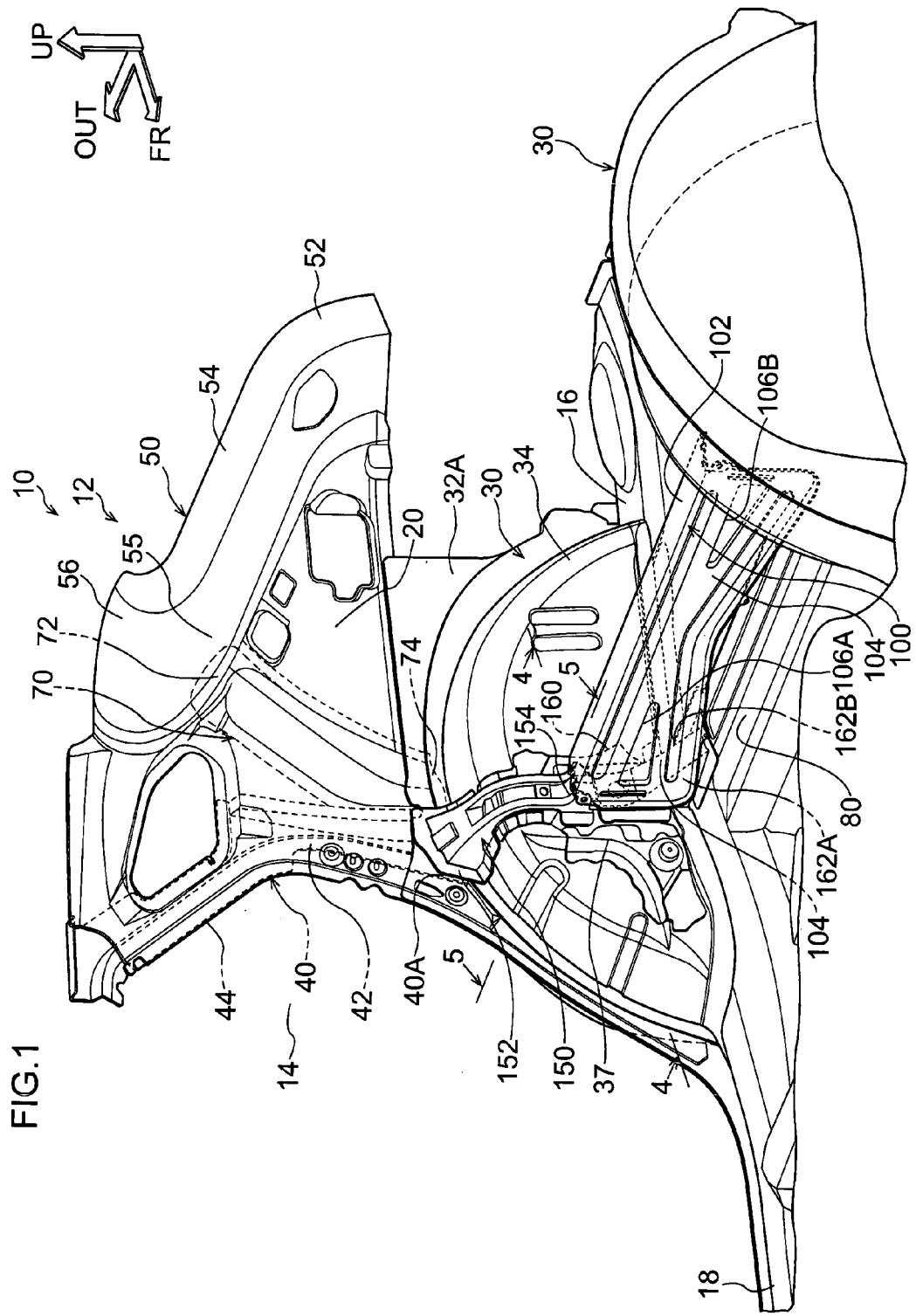
FIG. 1 is a perspective view in a case of viewing, from a vehicle transverse direction inner side, main portions of a rear portion of a vehicle to which a vehicle rear portion structure relating to an embodiment of the present invention is applied.
Figure 6:
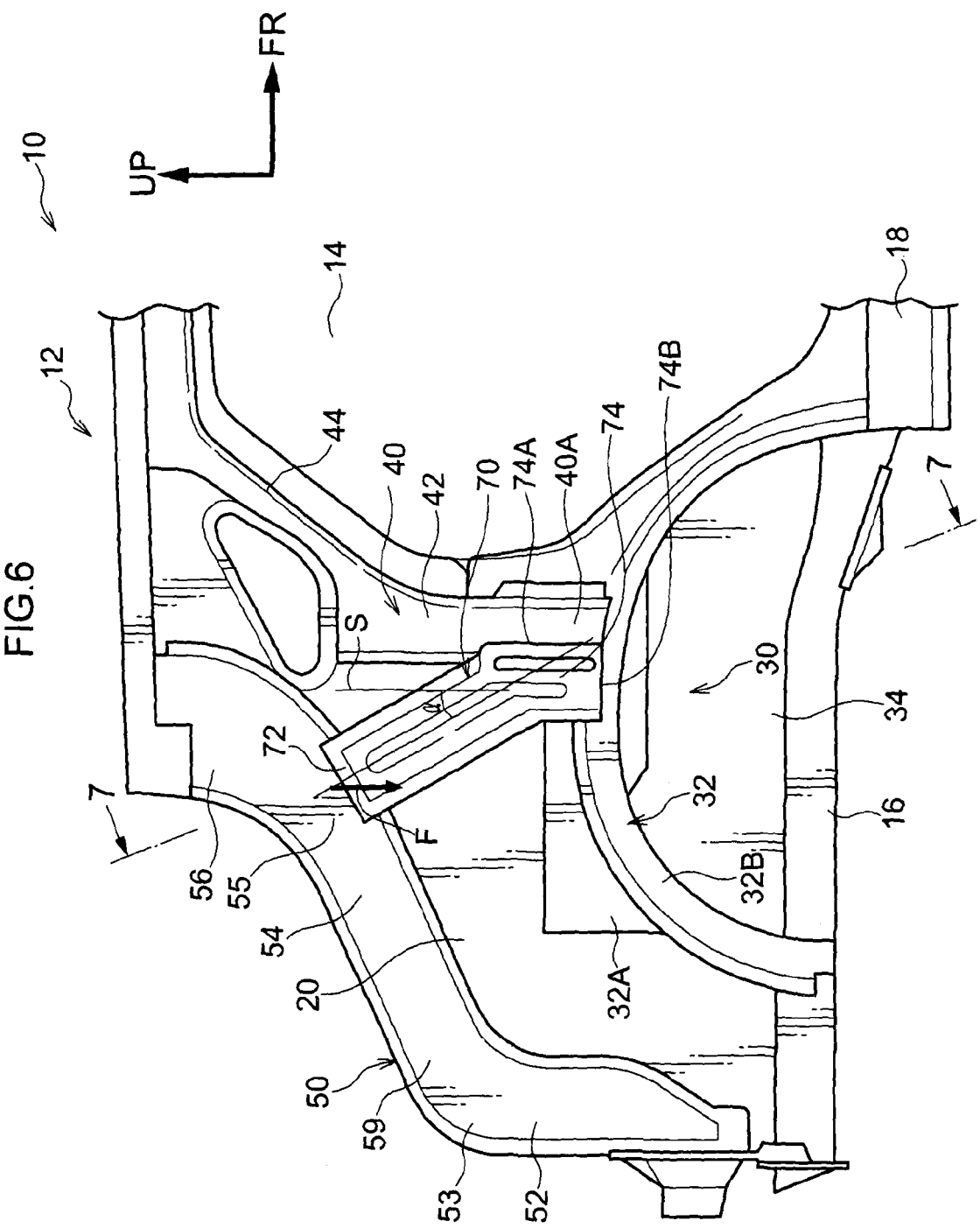
FIG. 6 is a side view in which main portions of the rear portion of the vehicle, to which the vehicle rear portion structure relating to the embodiment of the present invention is applied, are viewed from a vehicle transverse direction outer side.

As shown in FIG. 1 and FIG. 6, a roof side inner panel 20 is disposed at a vehicle side portion of a rear portion 12 of the vehicle 10. The roof side inner panel 20 is joined to a flange portion 32A of a wheel house outer 32 (see FIG. 6 and FIG. 7), that is described later, of a wheel house 30.

Figure 7:
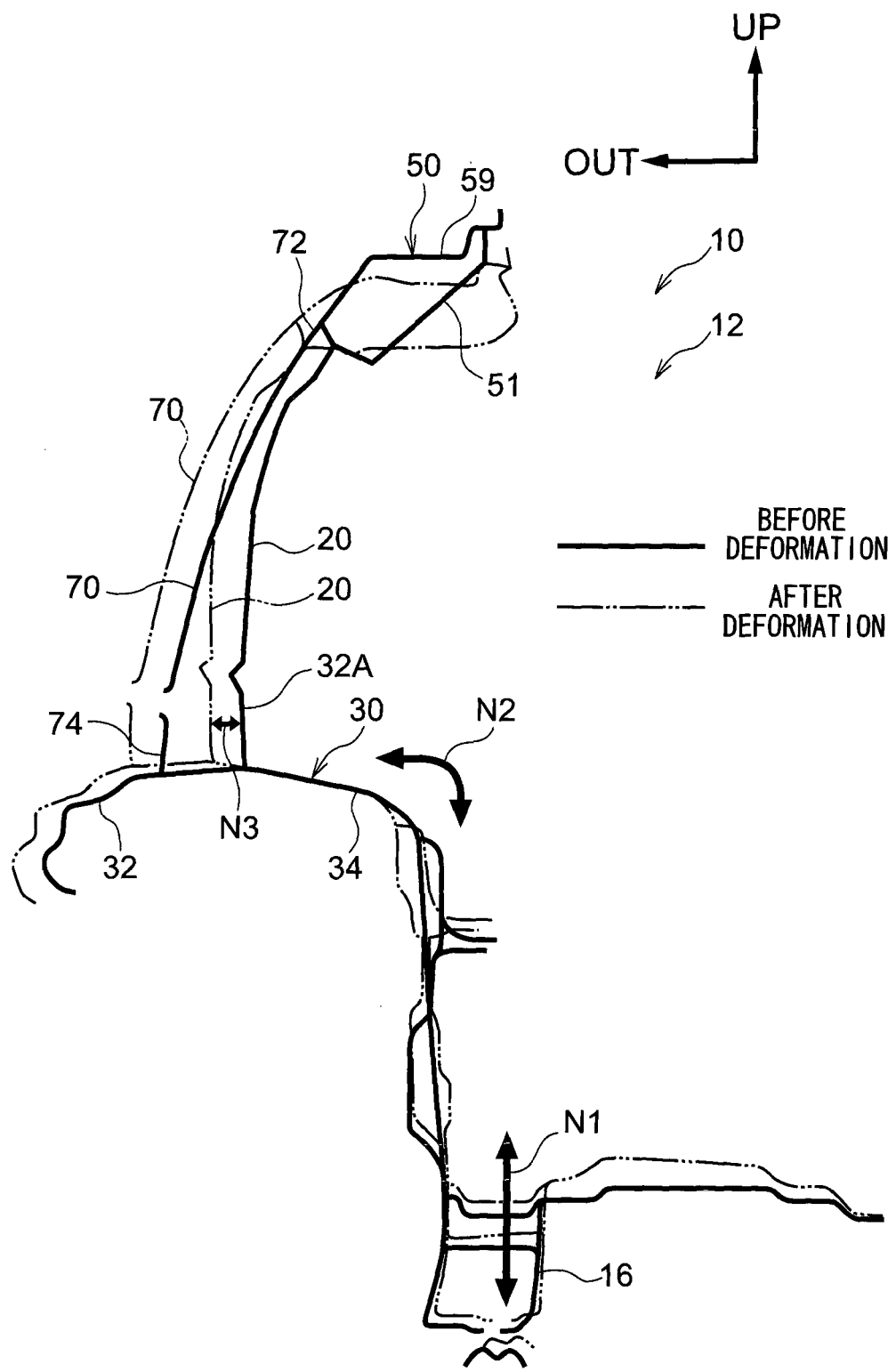
FIG. 7 is a cross-sectional view that schematically illustrates the cross-section along line 7-7 of FIG. 6, for explaining states before deformation and after deformation of a roof side inner panel.

The wheel house 30 is a member that covers the upper side of an unillustrated tire, and is structured by a wheel house inner 34 that structures the vehicle transverse direction inner side, and the wheel house outer 32 (see FIG. 6) that structures the vehicle transverse direction outer side (see FIG. 7 as well).

As shown in FIG. 6, the wheel house outer 32 is a press-molded part that is formed from a single steel plate, and has the flange portion 32A that is shaped as a vertical wall, and an outer side cover portion 32B that is substantially arc shaped as seen in a vehicle side view. Further, the outer side cover portion 32B projects-out further toward the vehicle transverse direction outer side than the roof side inner panel 20 and the flange portion 32A, and is formed so as to run along the outer surface of an unillustrated tire.

Figure 5:
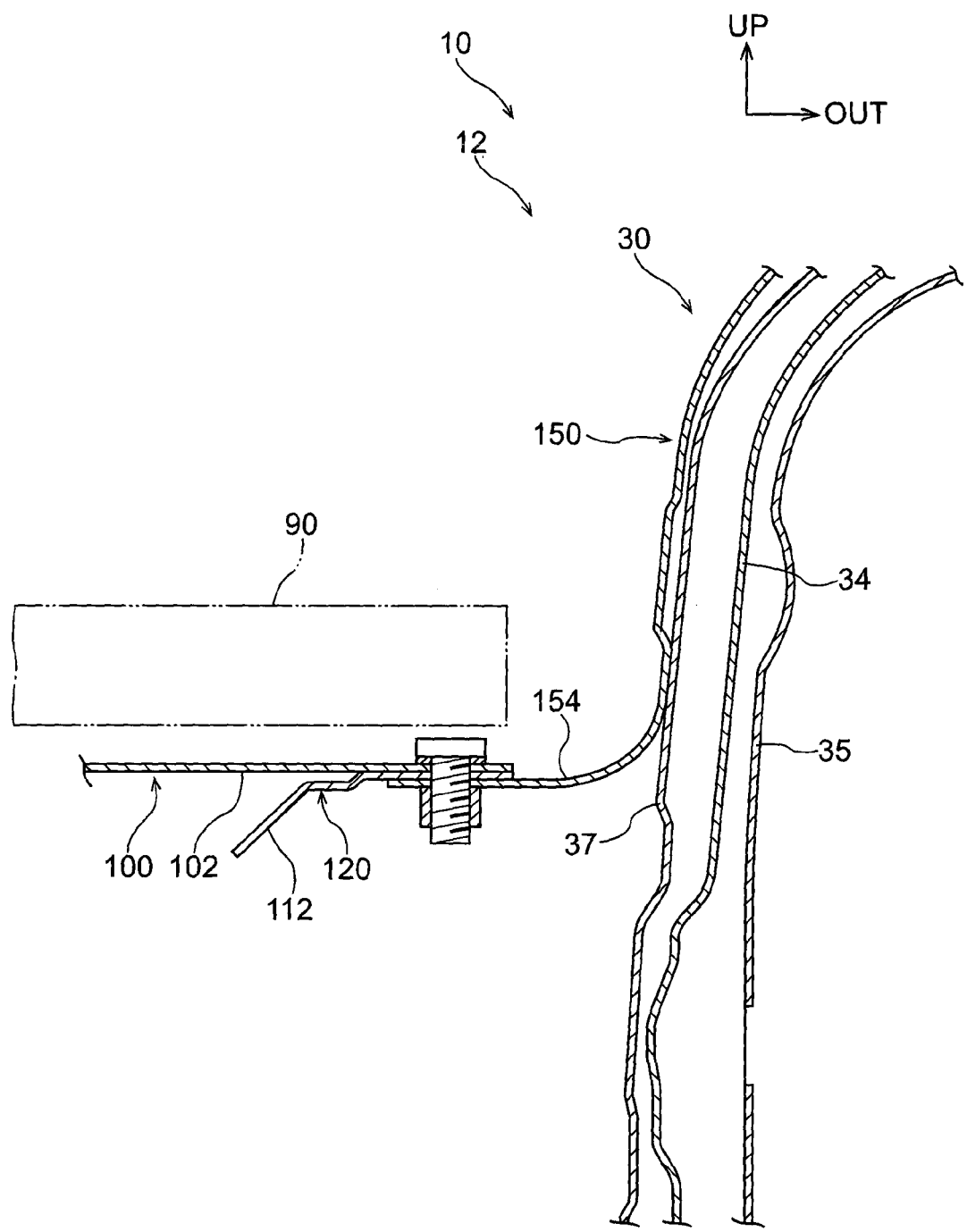
FIG. 5 is a cross-sectional view along line 5-5 of FIG. 1.

Moreover, as shown in FIG. 1 and FIG. 5, a reinforcement outer 35 (see FIG. 5) and a reinforcement inner 37 are provided at the vehicle transverse direction both sides of the wheel house inner 34, and are respectively joined to the wheel house inner 34.

As shown in FIG. 1 and FIG. 6, a rear side member 16 is joined to the lower end portion of the wheel house 30. The rear side member 16 is disposed at the vehicle lower side of the wheel house 30 with the vehicle longitudinal direction being the length direction thereof. Further, a rocker 18 is formed continuously with the rear side member 16 at the vehicle front side of the rear side member 16.

An unillustrated rear suspension mounting portion is connected to the rear side member 16 at a position in the vicinity of the front side lower end portion of the wheel house 30. An unillustrated rear suspension is mounted to this rear suspension mounting portion.

A first quarter pillar (C pillar) 40 is provided at the vehicle upper side of the wheel house 30. The first quarter pillar 40 extends overall in the vehicle vertical direction along the side edge portion of a side door opening portion 14 of the vehicle side portion. A lower end portion 40A of the first quarter pillar 40 is joined to the upper portion of the wheel house 30.

In further detail, the first quarter pillar 40 has a structure having, as seen in a vehicle side view, a first pillar lower portion 42 that is joined to the wheel house 30 and extends substantially toward the vehicle vertical direction upper side, and a first pillar upper portion 44 that extends toward a vehicle obliquely upper front side.

Further, the cross-sectional shape, that is orthogonal to the length direction, of the first quarter pillar 40 is a hat shape that opens toward the vehicle transverse direction inner side. The first quarter pillar 40 forms a closed cross-sectional structure by being joined to the roof side inner panel 20 and the vehicle transverse direction outer side of the flange portion 32A of the wheel house outer 32.

A second quarter pillar (D pillar) 50 is provided at the vehicle rear side of the first quarter pillar 40. The second quarter pillar (D pillar) 50 extends on the whole in the vehicle vertical direction along the side edge portion of an unillustrated back door opening portion of the vehicle rear end portion.

In further detail, the second quarter pillar 50 has a structure having, as seen in a vehicle side view, a second pillar lower portion 52 that extends substantially toward the vehicle vertical direction upper side, a second pillar inclined portion 54 that extends toward a vehicle obliquely upper front side, and a second pillar upper end portion 56 that extends substantially toward the vehicle vertical direction upper side.

Further, as shown in FIG. 7, the second quarter pillar 50 forms a closed cross-sectional structure due to a second quarter pillar inner 51, that structures the vehicle transverse direction inner side, and a second quarter pillar outer 59, that structures the vehicle transverse direction outer side, being joined together.

Note that the second quarter pillar 50 in the present embodiment is the first pillar from the vehicle rear side, and the first quarter pillar 40 is the second pillar from the vehicle rear side.

As shown in FIG. 1 and FIG. 6, a pillar connecting member 70, whose cross-sectional shape orthogonal to the length direction is a hat shape that opens toward the vehicle transverse direction inner side, is joined to the vehicle transverse direction outer side of the roof side inner panel 20. An upper end portion 72 of the pillar connecting member 70 is joined to a border portion 55 between the second pillar inclined portion 54 and the second pillar upper end portion 56 at the second quarter pillar 50. Further, a lower end portion 74 of the pillar connecting member 70 is joined to the joined region of the lower end portion 40A of the first quarter pillar 40 and the wheel house 30.

In further detail, as shown in FIG. 6, a side portion 74A at the vehicle front side of the lower end portion 74 of the pillar connecting member 70 is joined to the lower end portion 40A of the first quarter pillar 40, and a side portion 74B at the vehicle lower side is joined to the wheel house 30.

Further, in the present embodiment, an angle α of the pillar connecting member 70 with respect to vehicle vertical direction S as seen in a vehicle side view is an acute angle. Note that the angle α is an angle formed by the vehicle vertical direction S and a segment that connects the upper end portion 72 of the pillar connecting member 70, which upper end portion 72 is joined to the second quarter pillar 50, and the lower end portion 74 that is joined to the joined region of the first quarter pillar 40 and the wheel house 30.

As shown in FIG. 1, the both side portions in the vehicle transverse direction of a rear floor panel 80, that structures a vehicle bottom portion at the rear portion 12 of the vehicle 10, are joined to the wheel houses 30.

Figure 2:
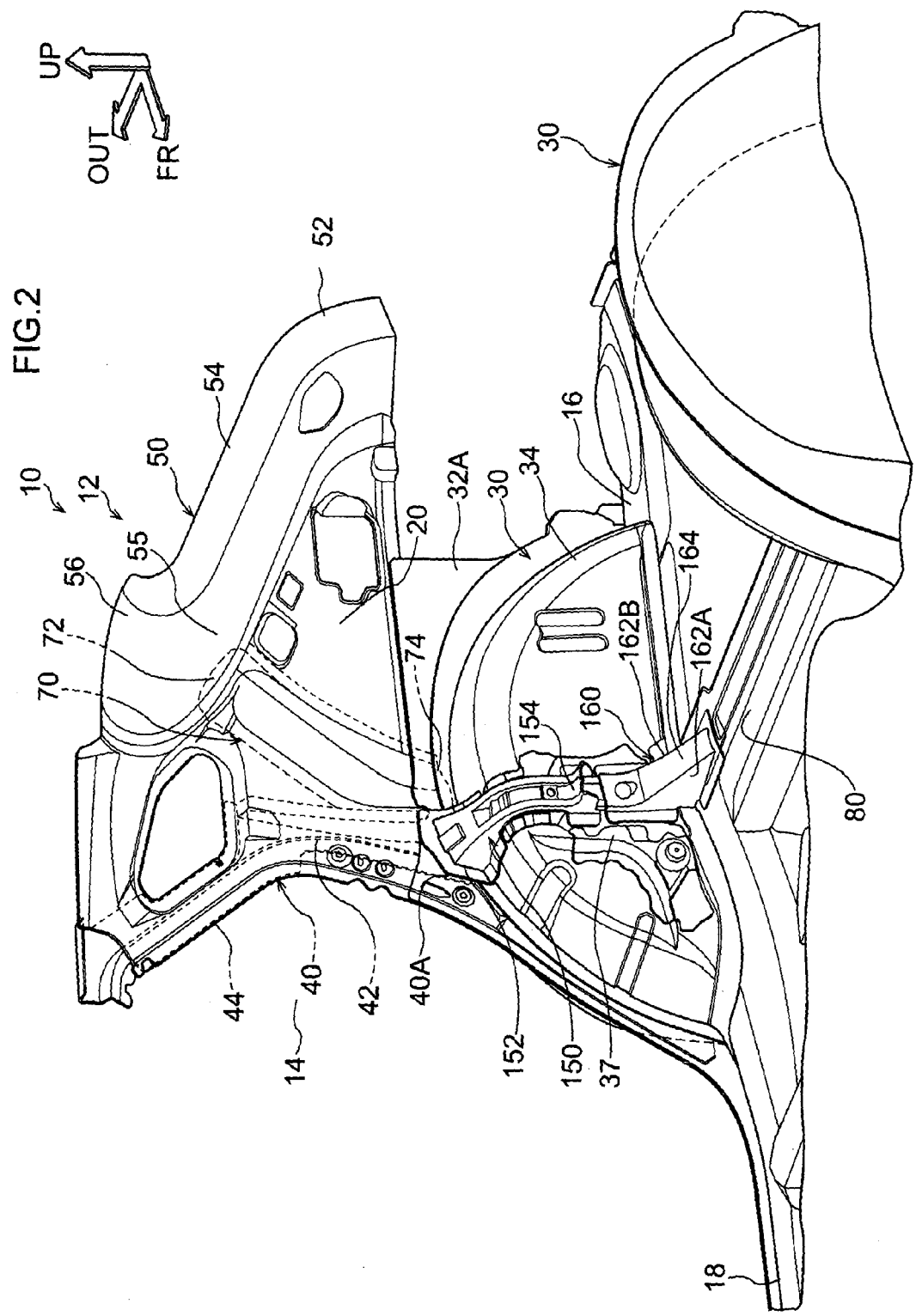
FIG. 2 is a perspective view, that corresponds to FIG. 1, of main portions of the rear portion of the vehicle in a state in which a wheel house connecting member is not provided.

As shown in FIG. 1 and FIG. 2, a joining stay 150 (see FIG. 4 as well), whose cross-sectional shape orthogonal to the length direction is a hat shape that opens toward the vehicle transverse direction outer side, is joined to the vehicle transverse direction inner side of (the reinforcement inner 37 and of the wheel house inner 34 of) the wheel house 30.

The joining stay 150 extends along the wheel house 30 toward the vehicle vertical direction upper side, and an upper end portion 152 thereof is joined to the vehicle transverse direction inner side of the joined region of the wheel house 30 and the lower end portion 40A of the first quarter pillar 40.

Figure 4:
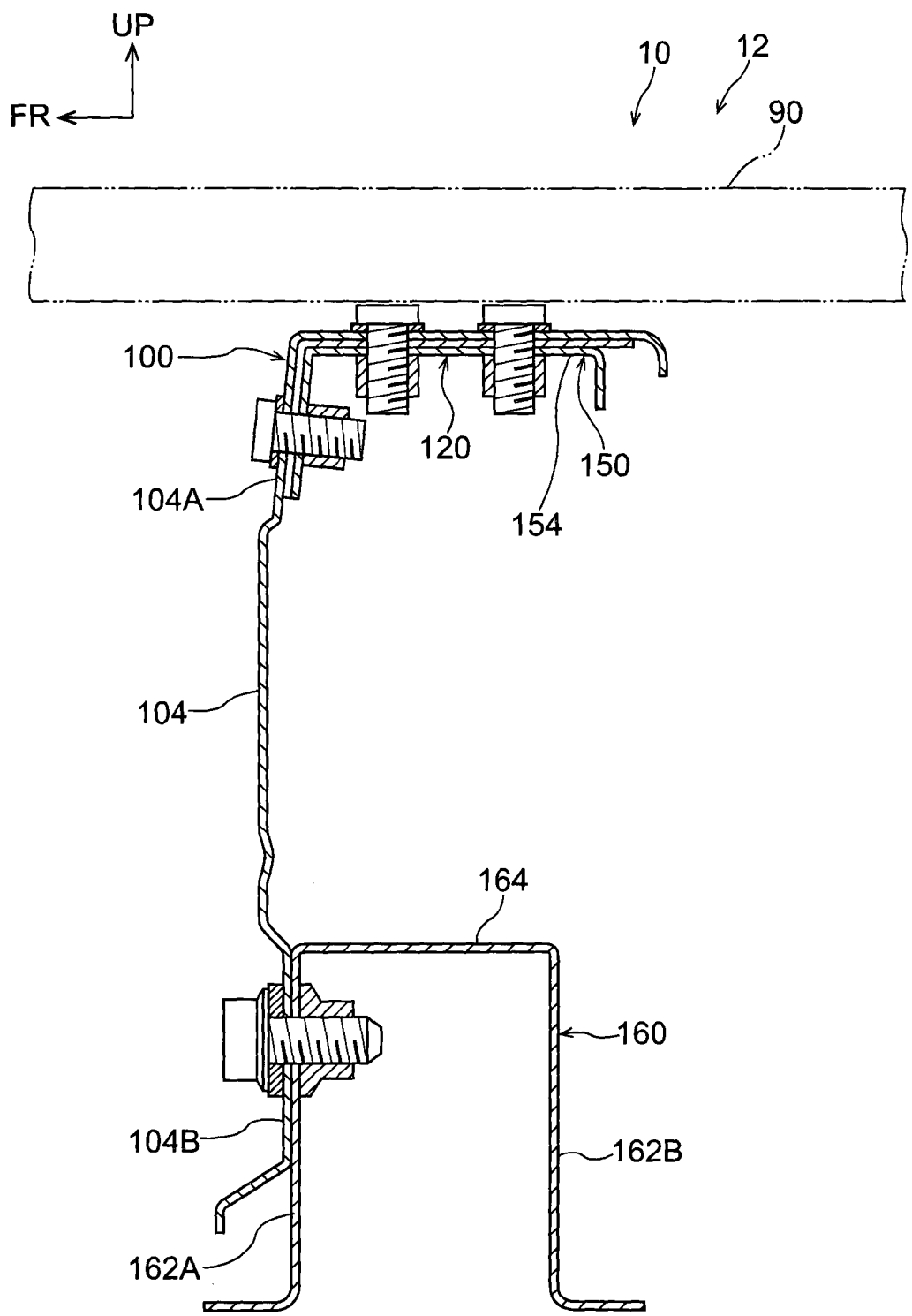
FIG. 4 is a cross-sectional view along line 4-4 of FIG. 1.

As shown in FIG. 1, FIG. 2 and FIG. 5, a lower end portion 154 of the stay 150 curves toward the vehicle transverse direction inner side and projects-out toward the vehicle transverse direction inner side (see FIG. 4 as well). Further, as shown in FIG. 4, the cross-sectional shape, along the vehicle vertical direction, of the lower end portion 154 of the joining stay 150 is formed in a hat shape that opens toward the vehicle lower side.

As shown in FIG. 1, FIG. 2 and FIG. 4, a fixing member 160 is provided at the vehicle vertical direction lower side of the joining stay 150. The fixing member 160 is structured to have side wall portions 162A, 162B that are substantially right triangular and are disposed with an interval therebetween in the vehicle longitudinal direction, and an inclined surface portion 164 that connects the inclined side portions of these side wall portions 162A, 162B and is inclined toward the lower side while heading toward the vehicle transverse direction inner side. Further, as shown in FIG. 1 and FIG. 2, the fixing member 160 is joined to the wheel house 30 and the rear floor panel 80.

As shown in FIG. 1, a wheel house connecting member 100 (see FIG. 3 as well) that connects the left and right wheel houses 30 is provided between the wheel houses 30.

Figure 3:
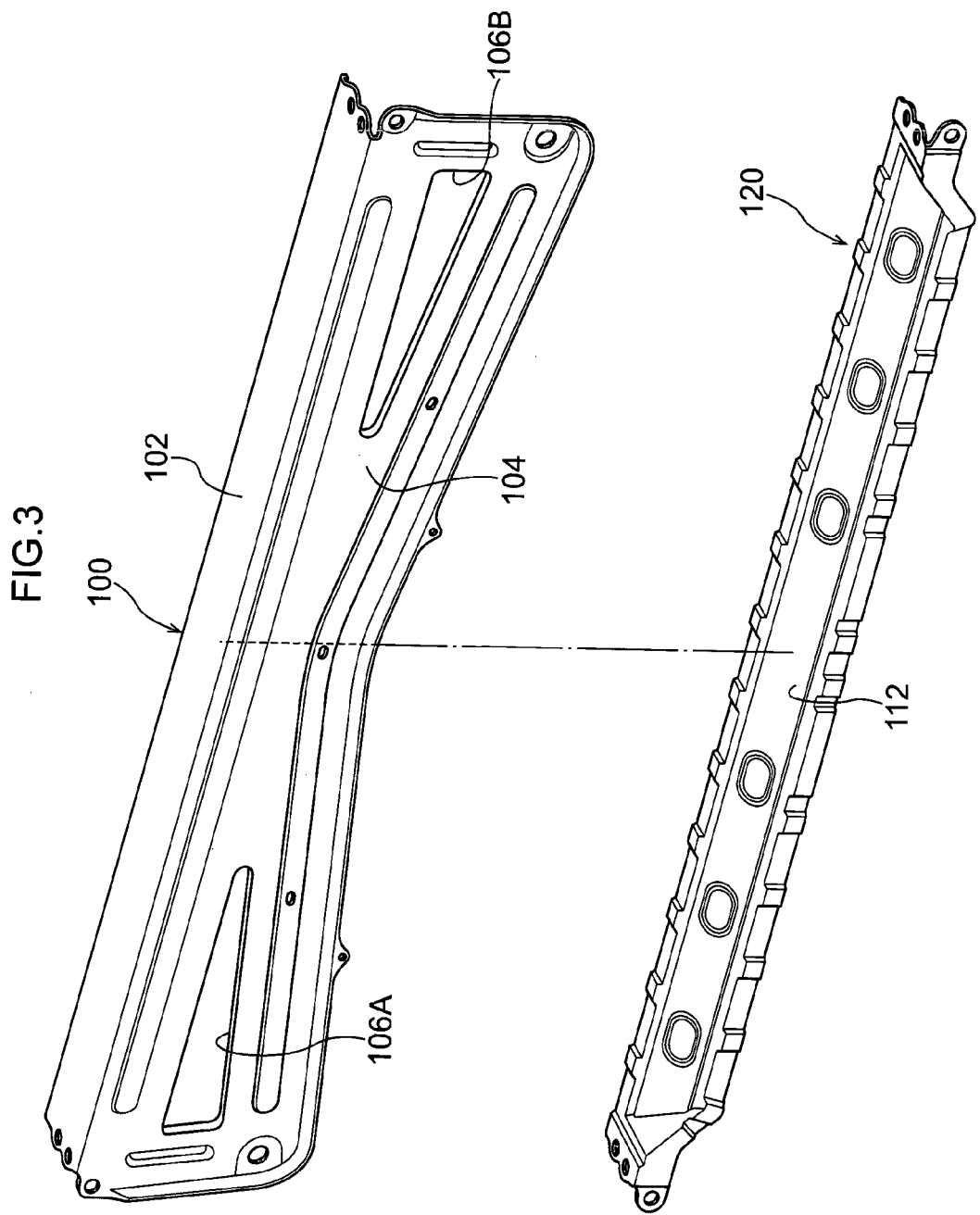
FIG. 3 is an exploded perspective view of a state before a wheel house connecting member and a reinforcing member are joined.

As shown in FIG. 1, FIG. 3 and FIG. 4, the wheel house connecting member 100 has a structure having a top surface portion 102 (see FIG. 5 as well) that is plate-shaped and extends in the vehicle transverse direction and has a width in the vehicle longitudinal direction, and a vertical wall portion 104 that extends toward the vehicle lower side from the vehicle front side end portion of the top surface portion 102 and structures the vehicle front side. Namely, the cross-sectional shape, along the vehicle longitudinal direction, of the wheel house connecting member 100 is formed in a substantial L-shape (see FIG. 4).

As shown in FIG. 1 and FIG. 3, through-holes 106A, 106B are formed in the vehicle transverse direction both side portions of the vertical wall portion 104 of the wheel house connecting member 100. These through-holes 106A, 106B are formed in right triangular shapes having inclined surfaces that are inclined toward the vehicle upper side while heading toward the vehicle transverse direction inner side.

As shown in FIG. 3, FIG. 4 and FIG. 5, a reinforcing member 120 is joined to the wheel house connecting member 100 of the present embodiment. The reinforcing member 120 is an elongated member whose length direction is the vehicle transverse direction. Further, the reinforcing member 120 has an inclined surface portion 112 (see FIG. 3 and FIG. 5) that extends in the vehicle transverse direction and is inclined downward while heading toward the vehicle front side. Further, the reinforcing member 120 is overlapped with and joined to the inner side of the upper portion of the wheel house connecting member 100.

As shown in FIG. 4, the top surface portion 102 and an upper end portion 104A of the vertical wall portion 104 of the wheel house connecting member 100, and the reinforcing member 120, are fastened by bolts (fastened together) to the lower end portion 154 of the joining stay 150 (see FIG. 5 as well). Namely, the top surface portion 102 and the upper end portion 104A of the vertical wall portion 104 of the wheel house connecting member 100 are joined to the wheel house 30 by the joining stay 150 that is provided at the wheel house 30. Note that, as described above, the joining stay 150 that is shown in FIG. 1 and FIG. 2 extends toward the vehicle vertical direction upper side, and the upper end portion 152 thereof is joined to the joined region of the first quarter pillar 40 and the wheel house 30.

Further, as shown in FIG. 4, a lower portion 104B of the vertical wall portion 104 of the wheel house connecting member 100 is fastened by bolts to the side wall portion 162A at the vehicle front side of the fixing member 160 (see FIG. 1 as well).

Note that, as shown in FIG. 4 and FIG. 5, the top surface portion 102 of the wheel house connecting member 100 of the present embodiment supports a deck board 90 that structures the floor of the luggage compartment of the rear portion 12 of the vehicle 10.

Operation and Effects

The operation and effects of the present embodiment are described next.

As shown in FIG. 1 and FIG. 4, the vehicle transverse direction both end portions of the top surface portion 102 (and the upper end portion 104A of the vertical wall portion 104) of the wheel house connecting member 100 are joined to the joining stays 150 that are provided at the wheel houses 30. The lower portion 104B at the both end portions in the vehicle transverse direction of the vertical wall portion 104, that extends toward the vehicle lower side from the top surface portion 102, are joined to the fixing members 160.

Figure 8:
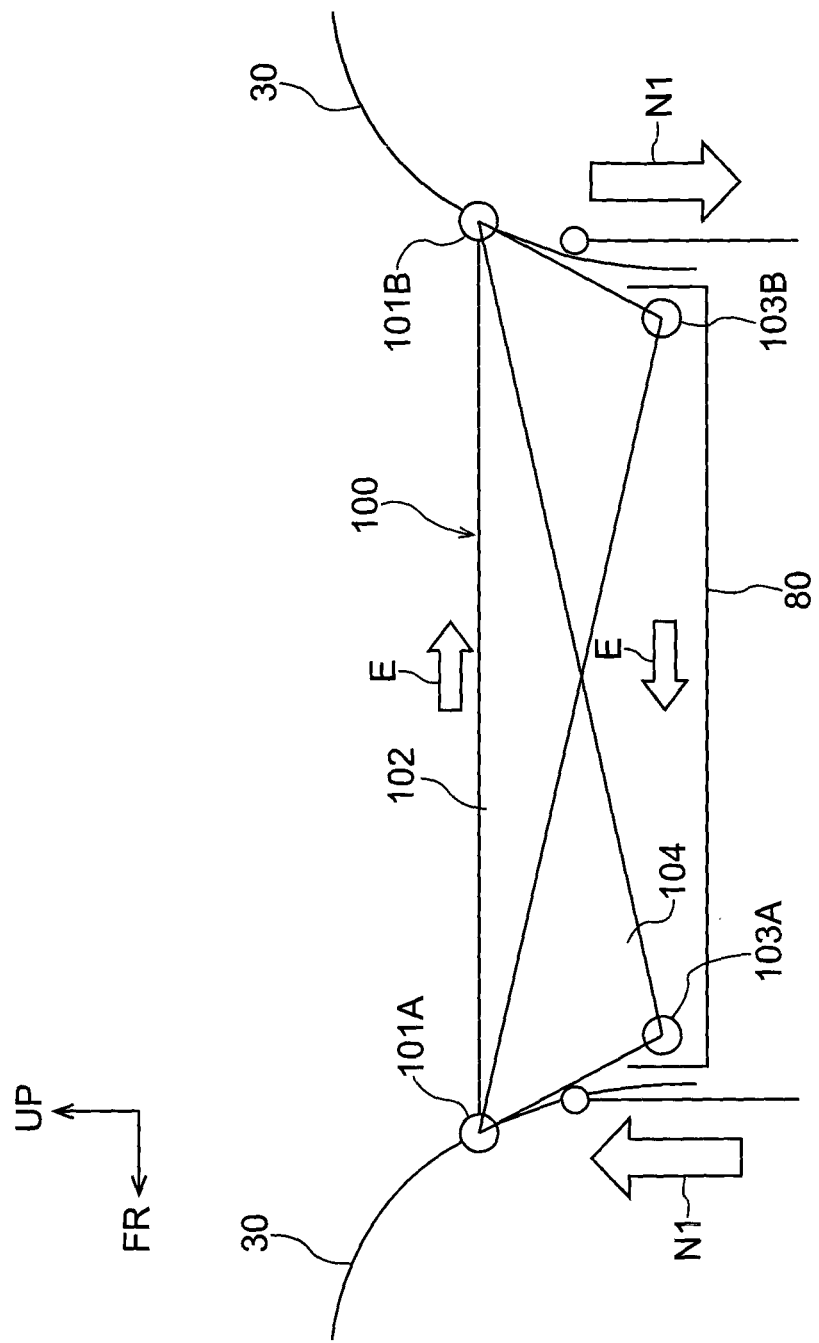
FIG. 8 is an elevation schematically showing the vehicle rear portion structure relating to the embodiment of the present invention.

Namely, as shown schematically in FIG. 8, at the vehicle transverse direction both end portions of the wheel house connecting member 100, the wheel house connecting member 100 is joined at four places that are upper side joining portions 101A, 101B and lower side joining portions 103A, 103B. Further, there is a structure in which these four joining portions 101A, 101B, 103A, 103B are disposed in a rectangular shape as seen in a vehicle rear view.

Accordingly, the wheel house connecting member 100 effectively resists shearing deformation in the vehicle transverse direction (refer to arrows E in FIG. 8). From another standpoint, the wheel house connecting member 100 is made into a shear panel.

Accordingly, the vehicle rigidity between the left and right wheel houses 30, that are connected by the wheel house connecting member 10 at the rear portion 12 of the vehicle 10, improves. Accordingly, so-called matchbox deformation, in which the body deforms in the form of a parallelogram as seen in a vehicle rear view due to twisting input being applied to the vehicle 10 by vertical motion (refer to arrow N1 in FIG. 7) due to road surface input at the time when the vehicle travels, is effectively suppressed by providing the wheel house connecting member 100.

Further, the steering stability and the comfort of the ride improve due to matchbox deformation of the vehicle 10 being effectively suppressed in this way.

Further, as shown in FIG. 4 and FIG. 5, the deck board 90 that structures the floor surface of the luggage compartment is supported by the top surface portion 102 of the wheel house connecting member 100. Namely, the wheel house connecting member 100 has two functions that are the function of improving the vehicle rigidity as described above, and the function of supporting the deck board 90. Accordingly, by providing the wheel house connecting member 100, deck board stays that support the deck board 90 can be reduced while the vehicle rigidity is improved. From another standpoint, by applying the present invention to the deck board stays, the deck board stays can be made to have the function of improving the vehicle rigidity.

Figure 11:
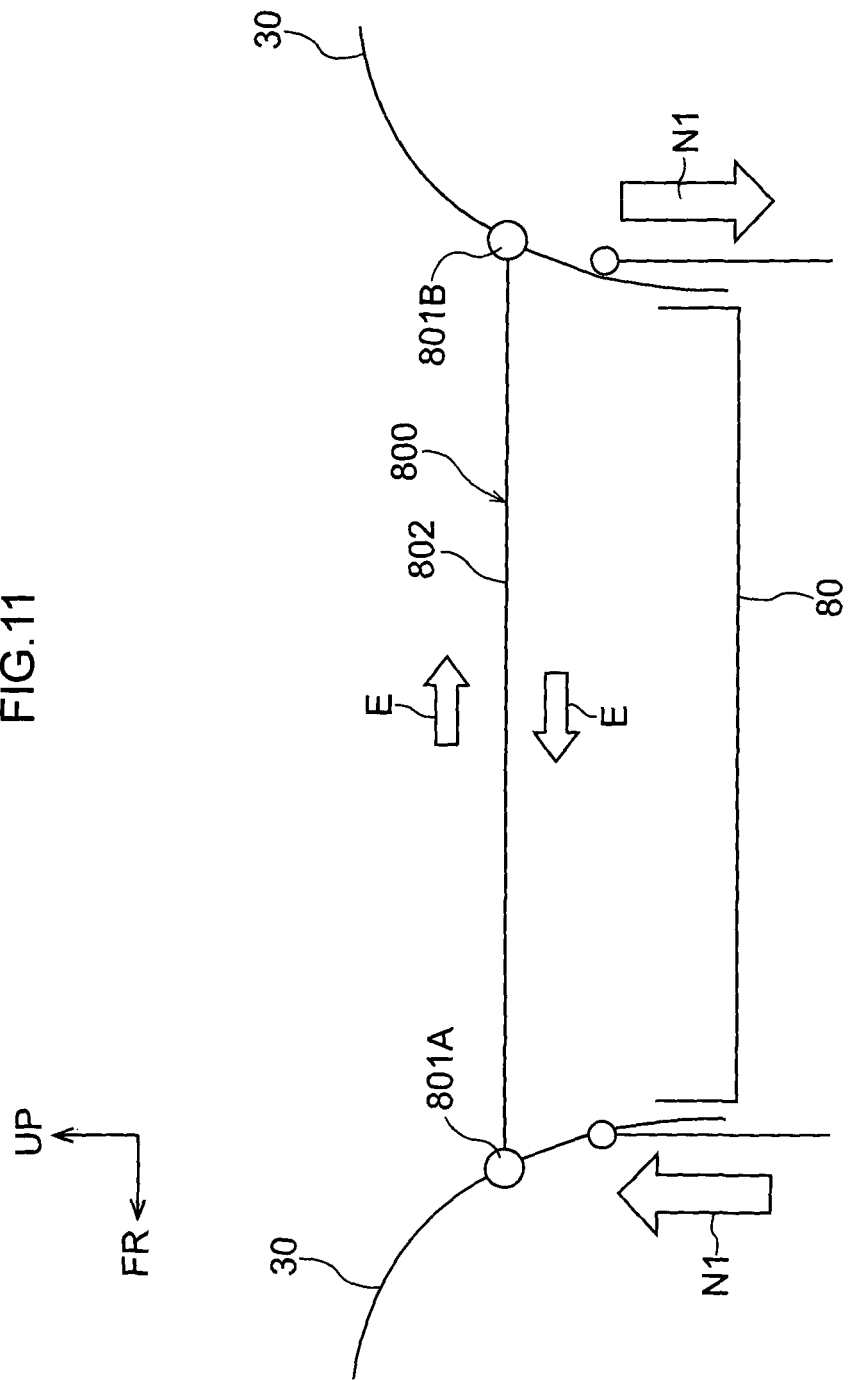
FIG. 11 is an elevation schematically showing the vehicle rear portion structure of the comparative example.

Here, description is given of a case in which the wheel houses 30 are connected by a wheel house connecting member 800 of a comparative example that is shown in FIG. 11 and to which the present invention is not applied.

As shown schematically in FIG. 11, the wheel house connecting member 800 of the comparative example supports the deck board 90 (see FIG. 4 and FIG. 5) at an upper portion 802. Further, only the vehicle transverse direction both end portions of the upper portion 802 of the wheel house connecting member 800 of the comparative example are joined to the wheel houses 30.

Accordingly, in the case of the comparative example, the wheel house connecting member 800 is joined, at the vehicle transverse direction both end portions thereof, by two joining portions 801A, 801B. Namely, the wheel house connecting member 800 of the comparative example is substantially joined by pins. Therefore, the wheel house connecting member 800 of the comparative example can support the deck board 90 (see FIG. 4 and FIG. 5), but can hardly exhibit any resistance force at all with respect to shearing deformation in the vehicle transverse direction as shown by arrows E.

Accordingly, the wheel house connecting member 800 of the comparative example can hardly improve at all the vehicle rigidity between the left and right wheel houses 30 that the wheel house connecting member 800 connects. Accordingly, the wheel house connecting member 800 of the comparative example can hardly exhibit at all an effect of suppressing so-called matchbox deformation in which the body deforms in the form of a parallelogram.

In contrast, as described above, the wheel house connecting member 100 of the present embodiment effectively resists shearing deformation in the vehicle transverse direction, and the vehicle rigidity between the wheel houses 30, that the wheel house connecting member 100 connects, effectively improves. Accordingly, so-called matchbox deformation in which the body deforms in the form of a parallelogram is suppressed.

Figure 9:
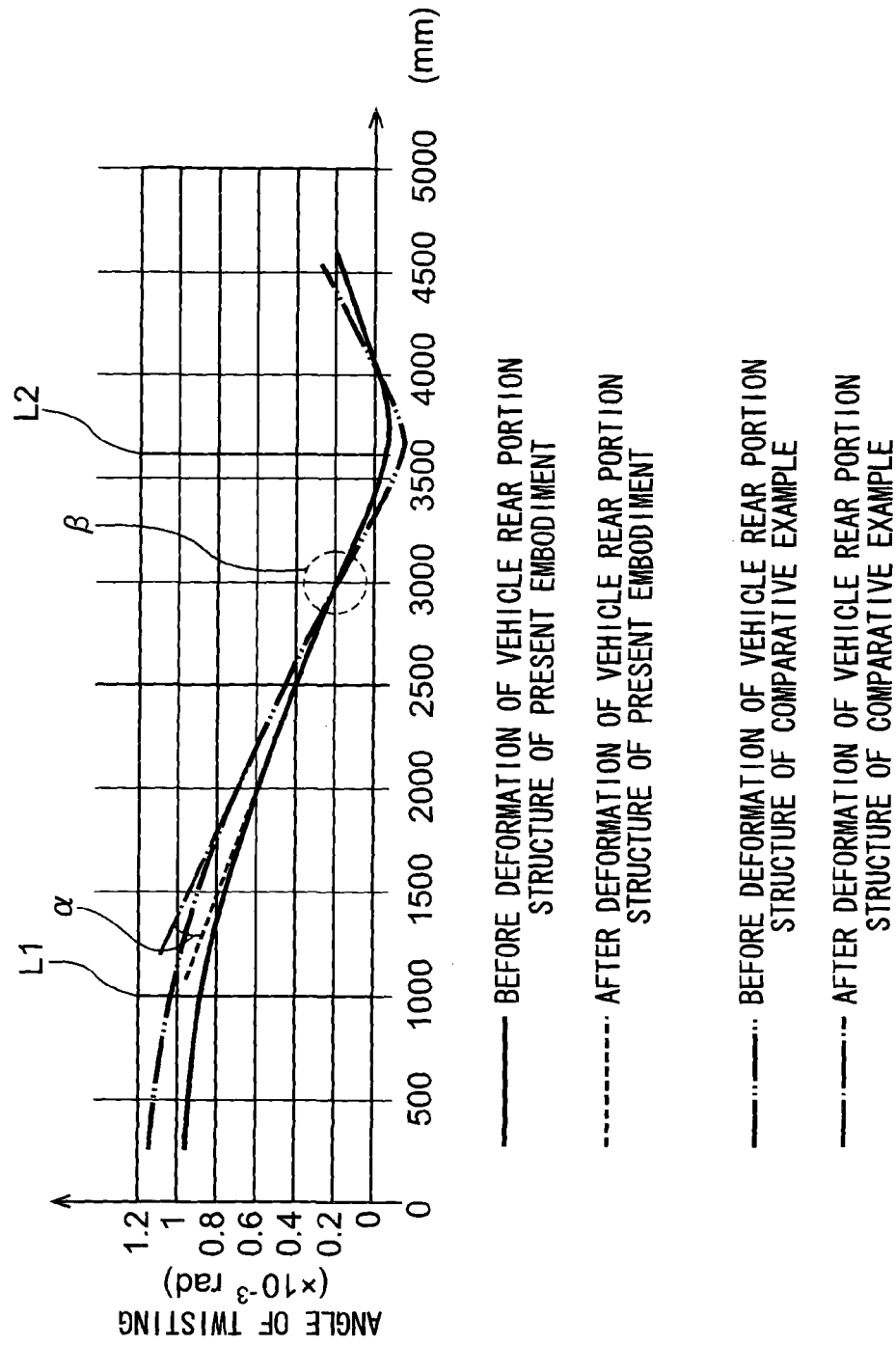
FIG. 9 is a graph showing angles of twisting of the vehicle to which the vehicle rear portion structure of the present embodiment is applied, and angles of twisting of a vehicle to which a vehicle rear portion structure of a comparative example is applied.

Further, FIG. 9 is a graph showing the angle of twisting of the vehicle at respective positions in the vehicle longitudinal direction. L1 in this graph represents the position of the front suspension in the vehicle longitudinal direction, and L2 represents the position of the rear suspension in the vehicle longitudinal direction. Further, the state before deformation of the vehicle 10, to which the vehicle rear portion structure relating to the present embodiment is applied, is shown by the solid line, and the state after deformation is shown by the dashed line. Further, the state before deformation of a vehicle, to which the vehicle rear portion structure of the comparative example of FIG. 11 is applied, is shown by the two-dot dashed line, and the state after deformation is shown by the one-dot dashed line.

As can be understood by looking at FIG. 9, at the vehicle 10 to which the vehicle rear portion structure of the present embodiment is applied, the angle of twisting is suppressed more than at the vehicle to which the vehicle rear portion structure of the comparative example of FIG. 11 is applied. More concretely, the change in the angle after deformation at the vehicle front side of the front suspension L1, that is shown by α in FIG. 9, of the vehicle of the present embodiment is smaller than that of the vehicle of the comparative example. Further, bending before deformation at the vehicle rear side of the rear suspension L2, that is shown by β in FIG. 9, of the vehicle of the present embodiment is smaller than that of the vehicle of the comparative example.

Accordingly, it can be understood that the vehicle rigidity of the vehicle 10, to which the vehicle rear portion structure of the present embodiment is applied, is improved more than that of the vehicle to which the vehicle rear portion structure of the comparative example of FIG. 11 is applied.

Further, as shown in FIG. 6, when twisting input is applied to the vehicle 10, the second quarter pillar 50 deforms so as to fall toward the vehicle vertical direction lower side. The pillar connecting member 70, whose lower end portion 74 is joined to the joined region of the wheel house 30 and the lower end portion 40A of the first quarter pillar 40 (the side portions 74A, 74B of the lower end portion 74 are joined to the lower end portion 40A of the first quarter pillar 40 and the wheel house 30), receives the falling-in deformation of this second quarter pillar 50.

Accordingly, the pillar connecting member 70, whose lower end portion 74 is fixed securely, receives the falling-in deformation of the second quarter pillar 50, and therefore, falling-in deformation of the second quarter pillar 50 is effectively suppressed.

Further, in the present embodiment, the pillar connecting member 70 is disposed such that the angle α with respect to the vehicle vertical direction S is an acute angle, as seen in a vehicle side view. Accordingly, there is a structure that receives the load F of the falling-in deformation of the second quarter pillar 50 more as axial force than as bending (twisting) deformation, and therefore, the falling-in deformation of the second quarter pillar 50 is suppressed more effectively.

Further, due the falling-in deformation of the second quarter pillar 50 being suppressed in this way, the rigidity of the rear portion 12 of the vehicle improves more, and the steering stability improves more.

Further, in the present embodiment, the upper end portion 152 of the joining stay 150 is joined to the joined region of the first quarter pillar 40 and the wheel house 30. Further, the wheel house connecting member 100 is joined to the lower end portion 154 of the joining stay 150.

Accordingly, the wheel house connecting member 100 and the joining stays 150 connect the joined regions of the first quarter pillars 40 and the wheel houses 30 at the vehicle transverse direction both sides (left and right). Further, the second quarter pillar 50 and the joined region of the first quarter pillar 40 and the wheel house 30 are joined by the pillar connecting member 70 at the vehicle transverse direction both sides. Accordingly, there is a structure in which the first quarter pillars 40, the pillar connecting members 70 and the second quarter pillars 50 at the vehicle transverse direction both sides (left and right) are connected by the wheel house connecting member 100 and the joining stays 150.

Accordingly, the vehicle rigidity of the rear portion 12 of the vehicle 10 is improved more effectively, and so-called matchbox deformation in which the body deforms in the form of a parallelogram as seen in a vehicle rear view is suppressed more effectively.

Further, as shown in FIG. 7, when the rear side member 16 moves vertically (refer to arrow N1) due to road surface input when the vehicle is traveling, the wheel house inner 34 deforms so as to fall laterally in the vehicle transverse direction (refer to arrow N2).

However, the lower end portion 74 of the pillar connecting member 70, whose upper end portion 72 is joined to the second quarter pillar 50, is joined to the wheel house 30. Accordingly, lateral falling deformation (arrow N2) of the wheel house inner 34 is suppressed, and relative displacement in the vehicle transverse direction between the wheel house inner 34 and the second quarter pillar 50 is suppressed. Accordingly, vibration (refer to arrow N3), in the vehicle transverse direction, of the roof side inner panel 20 that is due to lateral falling deformation, in the vehicle transverse direction, of the wheel house inner 34 is suppressed, and as a result, the NV performance (noise-and-vibration performance (the performance of suppressing vibrations and vibration noise)) improves.

Further, the wheel house connecting member 100 and the joining stays 150 connect the joined regions of the first quarter pillars 40 and the wheel houses 30 at the vehicle transverse direction both sides (left and right). Therefore, lateral falling deformation (arrow N2) of the wheel house inner 34 that is shown in FIG. 7 is suppressed more. Accordingly, vibration (refer to arrow N3), in the vehicle transverse direction, of the roof side inner panel 20 that is due to lateral falling deformation, in the vehicle transverse direction, of the wheel house inner 34 is suppressed more, and as a result, the NV performance (noise-and-vibration performance) improves more.

Other Points

Note that the present invention is not limited to the above-described embodiment.

For example, in the above-described embodiment, the vertical wall portion 104 of the wheel house connecting member 100, whose lower portion 104B is joined to the fixing members 160, extends toward the vehicle lower side from the vehicle front side end portion of the top surface portion 102 and structures the vehicle front side of the wheel house connecting member 100. However, the vertical wall portion is not limited to this. For example, there may be a structure in which the vertical wall portion extends toward the vehicle lower side from the vehicle rear side end portion of the top surface portion 102 of the wheel house connecting member 100 and structures the vehicle rear side. Or, there may be a structure having both the vertical wall portion 104, that extends toward the vehicle lower side from the vehicle front side end portion of the top surface portion 102 of the wheel house connecting member 100 and structures the vehicle front side, and a vertical wall portion that extends toward the vehicle lower side from the vehicle rear side end portion of the top surface portion 102 and structures the vehicle rear side.

Figure 10:
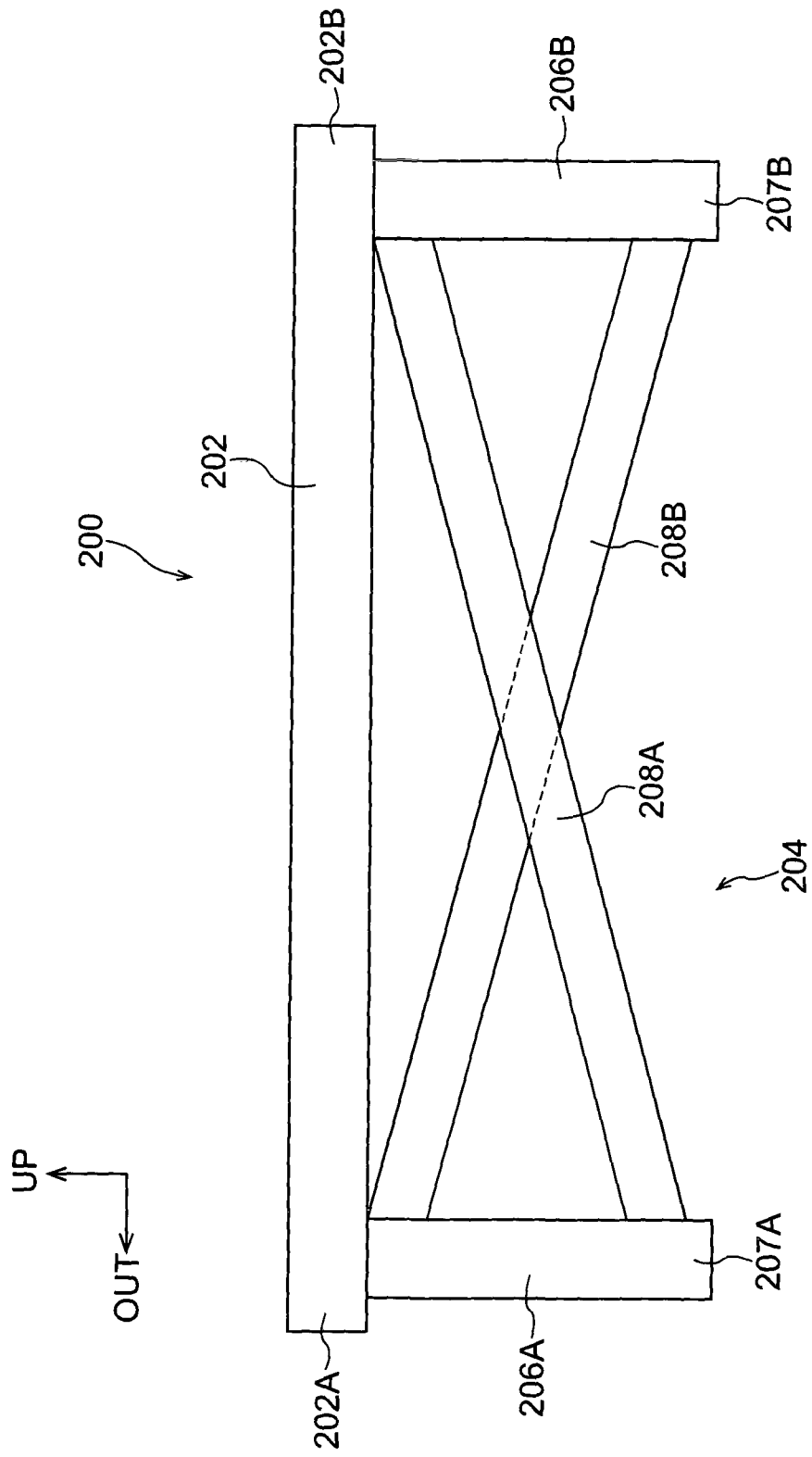
FIG. 10 is an elevation schematically showing a wheel house connecting member of another example.

Further, for example, there may be a structure in which, as in a wheel house connecting member 200 shown in FIG. 10, a lower side member 204 is joined to an upper side member 202 that is solid or tubular and that extends along the vehicle transverse direction. Further, the lower side member 204 is structured by pillar portions 206A, 206B that are solid or tubular and are joined to the lower portions of the vehicle transverse direction both end portions of the upper side member 202, and brace materials 208A, 208B that are solid or tubular and are disposed in an X-shape as seen in a vehicle front view. Note that end portions 202A, 202B in the vehicle transverse direction of the upper side member 202 are joined to the wheel houses 30, and lower portions 207A, 207B of the pillar portions 206A, 206B are joined to fixing members that are joined to the wheel houses 30 and the rear floor panel 80.

Further, for example, in the above-described embodiment, the pillar connecting member 70 is disposed such that the angle α with respect to the vehicle vertical direction S is an acute angle as seen in a vehicle side view. However, the pillar connecting member is not limited to this. For example, the pillar connecting member may be disposed such that the angle α with respect to the vehicle vertical direction S is an obtuse angle as seen in a vehicle side view. Further, the pillar connecting member may be a shape that is bifurcated into a V-shape or a Y-shape. Moreover, plural pillar connecting members may be provided.

Further, it goes without saying that the present invention can be implemented in various forms within a scope that does not depart from the gist thereof.

The disclosure of Japanese Patent Application No. 2013-258436 filed Dec. 13, 2013 is incorporated herein by reference in its entirety.

All publications, patent applications, and technical standards mentioned in this specification are herein incorporated by reference to the same extent as if each individual publication, patent application or technical standard was specifically and individually indicated to be incorporated by reference.

The invention claimed is:

1. A vehicle rear portion structure comprising:
    wheel houses that are provided at both side portions in a vehicle transverse direction at a vehicle rear portion, and to which lower end portions of first quarter pillars, that extend in a vehicle vertical direction, are joined, and to which both side portions of a rear floor panel, that structures a vehicle floor portion, are joined; and a wheel house connecting member that connects the wheel houses, wherein the wheel house connecting member comprises:

an upper side member that structures an upper portion side of the wheel house connecting member, and whose both end portions in the vehicle transverse direction are joined respectively to joining members that are joined to the wheel houses and the first quarter pillars; and a lower side member that extends toward a vehicle vertical direction lower side from the upper side member of the wheel house connecting member, and whose lower portions of both end portions in the vehicle transverse direction are joined respectively to fixing members that are joined to the wheel houses and the rear floor panel.

2. The vehicle rear portion structure of claim 1, wherein a deck board, that structures a floor surface of a luggage compartment, is supported by the upper side member of the wheel house connecting member.

3. The vehicle rear portion structure of claim 1, comprising:

second quarter pillars that are provided at vehicle rear sides of the first quarter pillars at the both side portions in the vehicle transverse direction of the vehicle rear portion, and that extend in the vehicle vertical direction; and pillar connecting members that are joined respectively to the second quarter pillars and joined regions of the first quarter pillars and the wheel houses, and that connect the second quarter pillars and the joined regions.

4. The vehicle rear portion structure of claim 3, wherein the pillar connecting members are disposed at acute angles with respect to the vehicle vertical direction as seen in a vehicle side view.

5. The vehicle rear portion structure of claim 2, comprising:

second quarter pillars that are provided at vehicle rear sides of the first quarter pillars at the both side portions in the vehicle transverse direction of the vehicle rear portion, and that extend in the vehicle vertical direction; and pillar connecting members that are joined respectively to the second quarter pillars and joined regions of the first quarter pillars and the wheel houses, and that connect the second quarter pillars and the joined regions.

6. The vehicle rear portion structure of claim 5, wherein the pillar connecting members are disposed at acute angles with respect to the vehicle vertical direction as seen in a vehicle side view.

* * * * *